(12) United States Patent
Dunn et al.

(10) Patent No.: US 7,029,728 B2
(45) Date of Patent: Apr. 18, 2006

(54) POLYMERIZABLE LIQUID CRYSTAL MATERIAL

(75) Inventors: Christopher J. Dunn, Southampton (GB); Simon Greenfield, Dorset (GB); Richard Harding, Hants (GB); Ian Victor Edward Hassall, Dorset (GB); Alison Linda May, Dorset (GB); Julian Frederick Samuel Vaughan-Spickers, Southampton (GB)

(73) Assignee: Merck Patent Gesellschaft mit beschraenkter Haftung, Darmstadt (DE)

( * ) Notice: Subject to any disclaimer, the term of this patent is extended or adjusted under 35 U.S.C. 154(b) by 332 days.

(21) Appl. No.: 10/135,425

(22) Filed: May 1, 2002

(65) Prior Publication Data

US 2003/0085377 A1    May 8, 2003

(30) Foreign Application Priority Data

May 8, 2001 (EP) ................... 01110189
Jul. 19, 2001 (EP) ................... 01116737

(51) Int. Cl.
*C09K 19/38* (2006.01)
*C09K 19/52* (2006.01)
*C09K 19/54* (2006.01)

(52) U.S. Cl. ............... 428/1.1; 428/1.2; 428/1.3; 428/1.31; 252/299.01; 252/299.5

(58) Field of Classification Search ........... 428/1.1, 428/1.3, 1.2, 1.31; 252/299.5, 299.01; 349/115, 349/175, 185

See application file for complete search history.

(56) References Cited

U.S. PATENT DOCUMENTS

| | | | | |
|---|---|---|---|---|
| 5,428,100 A | * | 6/1995 | Asai et al. | 524/496 |
| 5,609,943 A | * | 3/1997 | DeKoven et al. | 428/195.1 |
| 5,995,184 A | * | 11/1999 | Chung et al. | 349/118 |
| 6,417,902 B1 | * | 7/2002 | Greenfield et al. | 349/115 |
| 6,421,107 B1 | * | 7/2002 | Greenfield et al. | 349/115 |
| 6,491,990 B1 | * | 12/2002 | Parri et al. | 428/1.1 |

FOREIGN PATENT DOCUMENTS

| EP | 2324382 | * 12/1998 |
|---|---|---|
| WO | WO 99/45082 | * 9/1999 |

* cited by examiner

*Primary Examiner*—Shean C. Wu
(74) *Attorney, Agent, or Firm*—Millen, White, Zelano & Branigan, P.C.

(57) ABSTRACT

The invention relates to a polymerizable liquid crystal material containing at least one polymerizable surface-active compound, its use for the preparation of anisotropic polymer films, and the use of the liquid crystal material and the polymer films in optical and electrooptical devices, and for decorative and security applications.

44 Claims, No Drawings

POLYMERIZABLE LIQUID CRYSTAL MATERIAL

FIELD OF THE INVENTION

The invention relates to a polymerizable liquid crystal material comprising at least one polymerizable surface-active compound, its use for the preparation of anisotropic polymer films, and the use of the liquid crystal material and the polymer films in optical and electrooptical devices, and for decorative and security applications.

BACKGROUND AND PRIOR ART

Polymerizable liquid crystal materials are known in prior art for the preparation of anisotropic polymer films with uniform orientation. These films are usually prepared by coating a thin layer of a polymerizable liquid crystal mixture onto a substrate, aligning the mixture into uniform orientation and polymerizing the mixture.

For specific applications it is required to induce planar alignment in the liquid crystal layer, i.e. where the liquid crystal molecules are oriented substantially parallel to the layer. The alignment is then frozen in by polymerizing the liquid crystal mixture in situ. For example, oriented films or layers of polymerized nematic liquid crystal material with planar alignment are useful as A-plate compensators or polarizers. Another important application are oriented films or layers of polymerized cholesteric liquid crystal material having twisted molecular structure. If the cholesteric material has planar alignment, these films show selective reflection of light where the reflection color is dependent on the viewing angle. They can be used for example as circular polarizers, color filters or for the preparation of effect pigments for decorative or security applications.

Planar alignment can be achieved for example by treatment of the substrate onto which the liquid crystal material is coated, such as rubbing or application of alignment layers, or by applying shear forces to the liquid crystal material, for example during or after coating.

It is also known in the prior art that planar alignment of a liquid crystal material on a single substrate, with one surface of the liquid crystal material being open to the air, can be achieved or enhanced by addition of a surface active compound to the liquid crystal material.

WO 99/45082, for example, describes an optical retardation film that is obtained from a layer of polymerizable liquid crystal material with planar alignment comprising one or more fluorocarbon surfactants. U.S. Pat. No. 5,995,184 reports a method of making a phase retardation plate from a layer of polymerizable liquid crystal material with planar alignment, where a surface active material, for example, a polyacrylate, polysilicone or organosilane, is added to the liquid crystal material to reduce the tilt angle at the liquid crystal/air interface of the liquid crystal layer.

However, the methods to achieve planar alignment described in the above documents have several drawbacks. The surfactants often tend to phase separate from the liquid crystal material during or after polymerization. Also, if another layer is provided onto the polymerized liquid crystal film comprising the surfactant, the surfactant tends to migrate into the second layer. For example, in specific applications, such as cholesteric color filters, a film of polymerized cholesteric liquid crystal material is part of a composite LC cell, in which other layers need to be added to the cholesteric film, such as, but not restricted to, other liquid crystal, retardation or topcoat layers. During the addition of the subsequent layers conventional surfactant molecules are leached out of the bottom layer and migrate to the air interface. This results in a sample/air interface region which becomes progressively more concentrated in surfactant. Hence, subsequent layers have different surface energies and can no longer be thought of as being identical. The migration of surfactant can also cause a problem where it is desired to place a top layer which does not contain a surfactant, or where the surfactant can also cause other species to migrate from one layer to the next.

It is therefore an aim of the present invention to provide a polymerizable liquid crystal material for the preparation of a polymer film with planar alignment that does not have the drawbacks described above. Other aims of the present invention are immediately evident to the person skilled in the art from the following detailed description.

SUMMARY OF THE INVENTION

The aims of the invention can be achieved by providing a polymerizable liquid crystal mixture that comprises one or more polymerizable surface-active compounds. Polymerizable surfactants according to the present invention can be used as the polymerizable surface-active compounds in mixtures of polymerizable mesogenic materials. The polymerizable surfactants are readily polymerized into the liquid crystal film and hence any migration of the surfactant through to subsequent layers is drastically hindered. The present invention further demonstrates how to build a stack of layers in which one or more layers contain a low surface energy surfactant, such as a fluorochemical based surfactant, while maintaining the desired physical properties of the subsequent layers.

One object of the present invention is a polymerizable liquid crystal material comprising at least one polymerizable surface-active compound.

Another object of the present invention is a method of preparing an anisotropic polymer film with planar alignment with a low tilt angle, by applying a polymerizable liquid crystal material comprising one or more polymerizable surface-active compounds onto a substrate, aligning the material into planar orientation and polymerizing the material.

Another object of the present invention is an anisotropic polymer film with planar alignment and a low tilt angle obtained from a polymerizable liquid crystal material comprising one or more polymerizable surface-active compounds.

Another object of the present invention is the use of the polymerizable liquid crystal material and the polymer film according to the present invention as optical films for optical devices, and for decorative or security use, for example, alignment layers, polarizers, compensators, beam splitters, reflective films, color filters, holographic elements, hot stamping foils, colored images, decorative and security markings, and for the preparation of liquid crystal pigments for decorative and security applications.

Another object of the present invention is an alignment layer obtained from a polymerizable liquid crystal material comprising one or more polymerizable surface-active compounds.

Another object of the present invention is a cholesteric color filter obtained from a polymerizable cholesteric liquid crystal material comprising one or more polymerizable surface-active compounds.

Definitions of Terms

The term 'film' as used in this application includes self-supporting, i.e. free-standing, films that show more or less pronounced mechanical stability and flexibility, as well as coatings or layers on a supporting substrate or between two substrates.

The term 'mesogenic compounds' denotes compounds with a rod-shaped, lath-shaped or disk-shaped mesogenic group, i.e. a group with the ability to induce mesophase behaviour. These compounds do not necessarily exhibit mesophase behaviour by themselves. It is also possible that these compounds show mesophase behaviour only in mixtures with other compounds or when the mesogenic compounds or the mixtures comprising them are polymerized. Rod-shaped and lath-shaped mesogenic groups are preferred.

The term 'liquid crystal material' is used hereinafter for both liquid crystal materials and mesogenic materials, and the term 'mesogen' is used for the mesogenic groups of the material.

Unles stated otherwise, "tilt angle" of an anisotropic or liquid crystal layer or film is the average tilt angle throughout the film.

DETAILED DESCRIPTION OF THE INVENTION

The polymerizable liquid crystal mixture according to the present invention comprises one or more polymerizable mesogenic compounds and a polymerizable surfactant component comprising one or more surface-active compounds. When the liquid crystal mixture is coated onto a substrate, the surface-active compounds reduce the tilt angle of the liquid crystal molecules in the coated layer and thus enhance the planar alignment of the liquid crystal mixture. The surfactant copolymerizes with the monomers of the liquid crystal mixture, and is thus chemically bound into the forming polymer film. Thereby migration and/or phase separation of the surfactant are prevented.

The alignment of the polymerizable liquid crystal material can further be controlled by selection of the polymerizable mesogenic or liquid crystalline compounds. Thus, planar alignment with a low tilt angle can be achieved if the mixture contains only low amounts of polymerizable mesogenic compounds having non-polar terminal groups, and preferably consists essentially of compounds having polar terminal groups.

'Polar group' in particular means a group selected from halogen, CN, $NO_2$, OH, $OCH_3$, OCN, SCN, vinyloxy, acryl, methacryl, chloroacryl, epoxy, carbonyl or carboxyl with up to 4 C atoms, or mono-, oligo-, or polyfluorinated alkyl or alkoxy with 1 to 5 C atoms. Halogen is preferably F or Cl.

'Non-polar group' in particular means an aliphatic or aromatic alkyl group with 1 or more C atoms or an alkenyl or alkoxy group with 2 or more C atoms that is not a polar group.

Preferred polar groups are vinyloxy, acryl, methacryl, epoxy, F, Cl, OH, CN, $OCH_3$, $COCH_3$, $COC_2H_5$, $COOCH_3$, $COOC_2H_5$, $CF_3$, $C_2F_5$, $OCF_3$, $OCHF_2$, and $OC_2F_5$, in particular vinyloxy, acryl, methacryl, epoxy, F, Cl, CN, $OCH_3$ and $OCF_3$.

Preferred embodiments relate to a polymerizable liquid crystal material comprising less than 40%, preferably less than 20%, more preferably less than 10%, in particular less than 5% by weight of a polymerizable mesogenic compound(s) having a non-polar terminal group, wherein the ratio of the polymerizable mesogenic compound(s) with at least one polar terminal group to polymerizable mesogenic compound(s) with a non-polar terminal group is at least 2:1, preferably at least 3:1, in particular at least 5:1, containing no polymerizable mesogenic compound(s) having a non-polar group, essentially consisting of polymerizable mesogenic compound(s) having at least one polar terminal group, comprising 0.01 to 15%, preferably 0.1 to 5% by weight of polymerizable surface-active compound(s), comprising one or more surface-active compounds selected from polymerizable fluorocarbon surfactants, in particular fluorocarbon acrylates or fluorocarbon methacrylates comprising one or more surface-active compounds having a surface tension of 15 to 50 $mNm^{-1}$, comprising one or more surface-active compounds having a surface tension of less than 25 $mNm^{-1}$, comprising in addition to the polymerizable surfactant(s) only polymerizable mesogenic compound(s) having two or more, preferably two polymerizable groups, comprising at least 20% by weight of one or more polymerizable monoreactive mesogenic compounds having one polymerizable group and one polar terminal group, comprising less than 5% of non-polymerizable components, comprising one or more chiral compounds, comprising less than 15% of chiral components.

The surface-active compound(s) comprise at least one, preferably one or two polymerizable groups. They may also be mesogenic or liquid crystalline. Suitable surface-active compounds are for example those comprising one or more polymerizable groups selected from acryl, methacryl, epoxy, vinyl, vinyloxy, styrene or propenyl ether groups, in particular acryl, methacryl, epoxy or vinyloxy groups.

Preferably the polymerizable surface-active compounds comprise a polymerizable group that polymerizes under the same conditions as at least one of the polymerizable liquid crystal compounds of the mixture. Particularly preferably the polymerizable groups of the surface-active compounds and of the liquid crystal mixture are the same.

The average tilt angle of a polymerizable liquid crystal material according to the present invention on a single substrate, with one surface being open to the air, can be tailored between the inherent tilt angle of the liquid crystal material on the substrate, which is typically approximately 20–30°, to approximately 0°. The use of short chain, mixed fluorocarbon/hydrocarbon surfactants is preferred because their lower surface energy results in a greater reduction in the surface tension of the mixture for a given concentration of surfactant. Typical values for the surface tension of hydrocarbon, silicone and fluorochemical surfactants are $\geq 25$, 20–35 and 16–20 $mNm^{-1}$ respectively, as reported by L. Gehlhoff, "Fluorosurfactants for Paint and Coatings", product information of 3M (St. Paul, Minn., USA). The low surface tension of these fluorochemical surfactants has been utilised in the prior art, for example, in levelling agents for coatings (L.Gehlhoff "Fluorosurfactants for Paint and Coatings, 3M product information). Molecules with a low surface energy readily accumulate at the CLC/air interface, promoting the alignment effect.

Preferred are acrylic monomers with a perfluoroalkyl group or mixtures thereof, like e.g. Fluorad FX-13® and FX-14® commercially available from 3M (St. Paul, Minn., USA), which have the structures shown below $C_nF_{2n+1}SO_2N(C_2H_5)CH_2CH_2OCOCH=CH_2$   IX (FX-13)

$C_nF_{2n+1}SO_2N(C_2H_5)CH_2CH_2OCOC(CH_3)=CH_2$   X (FX-14)

wherein n is an integer from 4 to 8, and the perfluoroalkyl group may be linear or branched.

Upon using these surfactants it is possible to produce anisotropic polymer films with planar alignment having a low tilt angle in the range from 0 to 3 degrees, in particular 0 to 1.5 degrees. In the ideal case the tilt angle is approximately 0 degrees.

A preferred embodiment relates to a polymer film with planar alignment comprising a polymerized nematic liquid crystal material according to the present invention.

Another preferred embodiment relates to a polymer film with planar alignment comprising a polymerized cholesteric liquid crystal material according to the present invention.

In a preferred embodiment the polymerizable liquid crystal material comprises at least one polymerizable compound having two or more polymerizable functional groups (di- or multireactive or di- or multifunctional compound), which can be a mesogenic compound or a surface-active compound. Upon polymerization of such a mixture a three-dimensional polymer network is formed. A polymer film made of such a network is self-supporting and shows a high mechanical and thermal stability and a low temperature dependence of its liquid crystal properties. In the ideal case the liquid crystal properties of the polymer film are temperature independent.

By varying the concentration of the multifunctional mesogenic or non mesogenic compounds, the crosslink density of the resulting polymer film and thereby its physical and chemical properties, such as the glass transition temperature, which is also important for the temperature dependence of the optical properties of the film, the thermal and mechanical stability or the solvent resistance can be tuned easily.

Preferably the polymerizable material comprises 5 to 100%, in particular 25 to 80%, more preferably 45 to 70%, by weight of multireactive mesogenic compound(s). Di-reactive mesogenic compounds are particularly preferred.

The polymerizable mesogenic compounds of the liquid crystal material are preferably of formula I P-(Sp-X)$_n$-MG-R   I wherein
P is a polymerizable group,
Sp is a spacer group having 1 to 25 C atoms,
X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH=CH—, —CH=CH—COO—, —OCO—CH=CH—, —C≡C—, or a single bond,
n is 0 or 1,
MG is a mesogenic group, and
R is H, CN, NO$_2$, P-(Sp-X)$_n$— halogen or a straight-chain or branched alkyl group with up to 25 C atoms which is optionally unsubstituted, mono- or polysubstituted by halogen or CN, wherein one or more non-adjacent CH$_2$ groups are optionally and independently replaced by —O—, —S—, —NH—, —N(CH$_3$)—, —CO—, —COO—, —OCO—, —OCO—O—, —S—CO—, —CO—S— or —C≡C— in a manner that oxygen atoms are not linked directly to one another.

MG in formula I is preferably selected of formula II

-A$^1$-Z$^1$-(A$^2$-Z$^2$-)$_m$-A$^3$-   II wherein
Z$^1$ and Z$^2$ are each independently —COO—, —OCO—, —CH$_2$CH$_2$—, —OCH$_2$—, —CH$_2$O—, —CH=CH—, —CH=CH—COO—, —OCO—CH=CH—, —C≡C—, or a single bond,
A$^1$, A$^2$ and A$^3$ are, independently, 1,4-phenylene wherein one or more CH groups are optionally replaced by N, 1,4-cyclohexylene wherein one or two non-adjacent CH$_2$ groups are optionally and independently replaced by O or S, 1,4-cyclohexenylene, 1,4-bicyclo(2,2,2)octylene, piperidine-1,4-diyl, naphthalene-2,6-diyl, decahydronaphthalene-2,6-diyl, or 1,2,3,4-tetrahydro-naphthalene-2,6-diyl, which are, each independently, unsubstituted, mono- or polysubstituted with F,Cl, OH, CN, NO$_2$ or an alkyl, alkoxy or alkanoyl group having 1 to 7 C atoms wherein one or more H atoms may be substituted by F or Cl, and
m is 0, 1 or 2.

A group of preferred mesogenic groups of formula II is listed below. For reasons of simplicity, Phe in these groups is 1,4-phenylene, PheL is a 1,4-phenylene group which is substituted by 1 to 4 L groups, wherein L is F, Cl, CN, OH, NO$_2$ or an optionally fluorinated or chlorinated alkyl, alkoxy or alkanoyl group with 1 to 7 C atoms, and Cyc is 1,4-cyclohexylene. The following mesogenic groups of formulae II-1 to II-25, as well as their mirror images, are preferred.

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |
| -Cyc-Z-Phe-Z-Cyc- | II-10 |
| -Phe-Z-Cyc-Z-Cyc- | II-11 |
| -Cyc-Z-Cyc-Z-Cyc- | II-12 |
| -Phe-Z-Phe-Z-PheL- | II-13 |
| -Phe-Z-PheL-Z-Phe- | II-14 |
| -PheL-Z-Phe-Z-Phe- | II-15 |
| -PheL-Z-Phe-Z-PheL- | II-16 |
| -PheL-Z-PheL-Z-Phe- | II-17 |
| -PheL-Z-PheL-Z-PheL- | II-18 |
| -Phe-Z-PheL-Z-Cyc- | II-19 |
| -Phe-Z-Cyc-Z-PheL- | II-20 |
| -Cyc-Z-Phe-Z-PheL- | II-21 |
| -PheL-Z-Cyc-Z-PheL- | II-22 |
| -PheL-Z-PheL-Z-Cyc- | II-23 |
| -PheL-Z-Cyc-Z-Cyc- | II-24 |
| -Cyc-Z-PheL-Z-Cyc- | II-25 |

Particularly preferred are the mesogenic groups of formulae II-1, II-2, II-4, II-6, II-7, II-8, II-11, II-13, II-14, II-15 and II-16.

In the above preferred groups Z in each case independently has one of the meanings of Z$^1$ as given in formula I. Preferably Z is —COO—, —OCO—, —CH$_2$CH$_2$—, —C≡C— or a single bond.

More preferably, the mesogenic group MG is of the following formulae and their mirror images

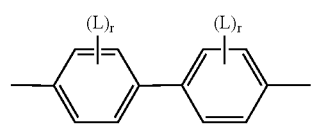

IIa

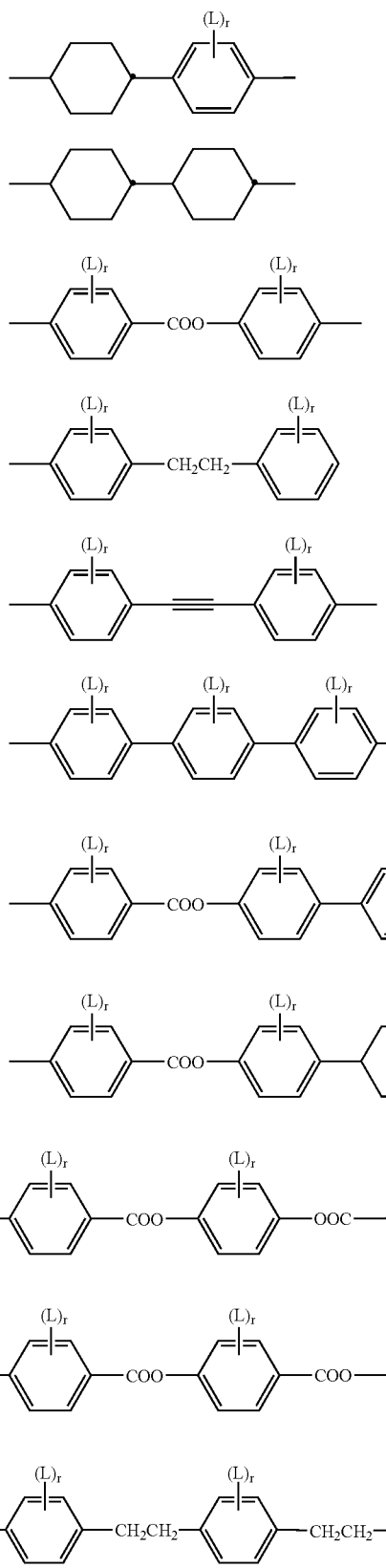

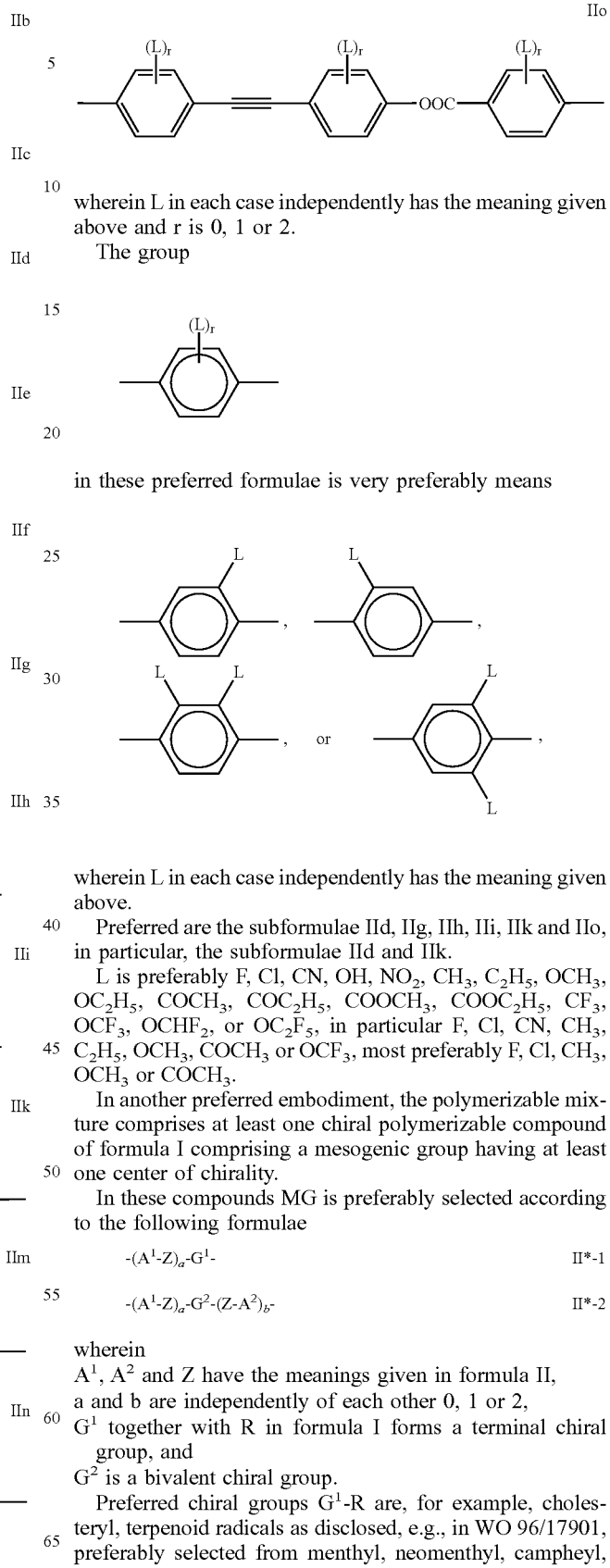

wherein L in each case independently has the meaning given above and r is 0, 1 or 2.

The group in these preferred formulae is very preferably means wherein L in each case independently has the meaning given above.

Preferred are the subformulae IId, IIg, IIh, IIi, IIk and IIo, in particular, the subformulae IId and IIk.

L is preferably F, Cl, CN, OH, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, or $OC_2F_5$, in particular F, Cl, CN, $CH_3$, $C_2H_5$, $OCH_3$, $COCH_3$ or $OCF_3$, most preferably F, Cl, $CH_3$, $OCH_3$ or $COCH_3$.

In another preferred embodiment, the polymerizable mixture comprises at least one chiral polymerizable compound of formula I comprising a mesogenic group having at least one center of chirality.

In these compounds MG is preferably selected according to the following formulae $$-(A^1-Z)_a-G^1- \qquad \text{II*-1}$$

$$-(A^1-Z)_a-G^2-(Z-A^2)_b- \qquad \text{II*-2}$$

wherein
$A^1$, $A^2$ and Z have the meanings given in formula II,
a and b are independently of each other 0, 1 or 2,
$G^1$ together with R in formula I forms a terminal chiral group, and
$G^2$ is a bivalent chiral group.

Preferred chiral groups $G^1$-R are, for example, cholesteryl, terpenoid radicals as disclosed, e.g., in WO 96/17901, preferably selected from menthyl, neomenthyl, campheyl, pineyl, terpineyl, isolongifolyl, fenchyl, carreyl, myrthenyl, nopyl, geraniyl, linaloyl, neryl, citronellyl and dihydrocitronellyl, in particular menthyl or menthone derivatives or terminal chiral sugar derivatives comprising a mono- or bicyclic radical with pyranose or furanose rings, for example, a group derived from the chiral sugars disclosed in WO 95/16007.

Preferred chiral groups $G^2$ are for example cholesteryl or groups derived from sugars, binaphthyl derivatives, or optically active glycols, especially ethane-1,2-diol substituted in 1- and/or 2-position with alkyl or aryl groups. In case of sugar groups, these are preferably selected from mono- and dicyclic groups comprising pentose or hexose rings.

Preferred are the following groups $G^2$

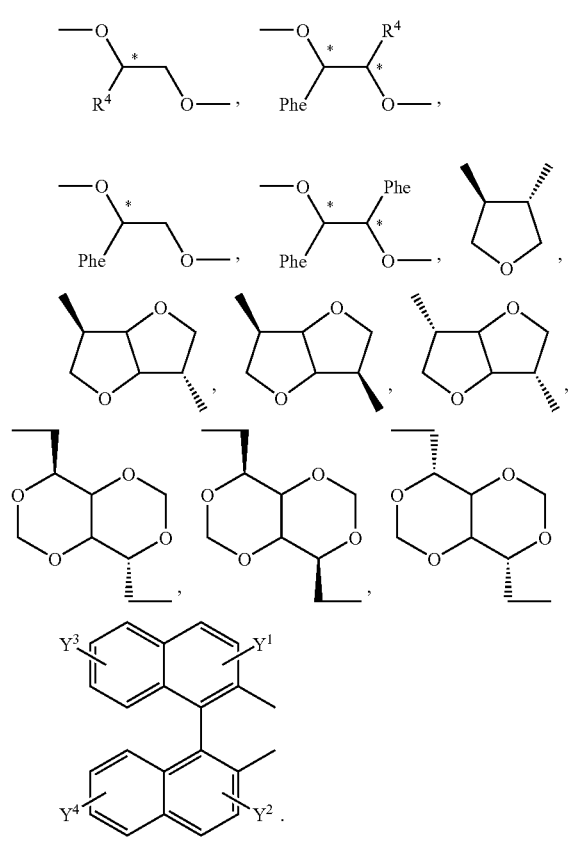

wherein Phe has the meaning given above, $R^4$ is F or optionally fluorinated alkyl with 1 to 4 C atoms and $Y^1$, $Y^2$, $Y^3$ and $Y^4$ have one of the meanings of $R^1$ in formula I.

Preferably $G^2$ is dianhydrosorbitol, substituted ethane diol, preferably

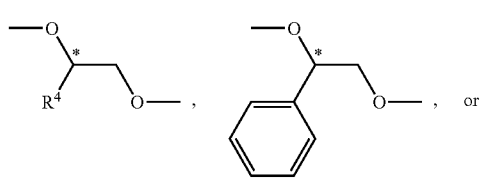

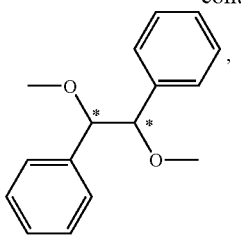

wherein $R^4$ is F, $CH_3$ or $CF_3$, or optionally substituted binaphthyl

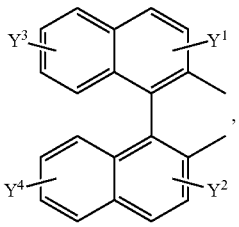

wherein $Y^1$, $Y^2$, $Y^3$ and $Y^4$ are H, F or optionally fluorinated alkyl with 1 to 8 C atoms.

Preferably $-(A^1-Z)_a-$ and $-(Z-A^2)_b-$ in formulae II1* and II2* are selected of the above disclosed preferred formulae II-1 to II-25 and IIa to IIo, most preferably of formulae II1 to II6 and IIa to IIf.

In case of a polymerizable mesogenic compound with a non-polar group, R is preferably alkyl with up to 15 C atoms or alkoxy with 2 to 15 C atoms.

When R is an alkyl or alkoxy radical, wherein the terminal $CH_2$ group is replaced by —O—, it is straight-chain or branched. It is preferably straight-chain, has 2, 3, 4, 5, 6, 7 or 8 carbon atoms and is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl.

In case of a polymerizable mesogenic compound with a terminal polar group, R is selected from CN, $NO_2$, halogen, $OCH_3$, OCN, SCN, $COR^1$, $COOR^1$ or a mono- oligo- or polyfluorinated alkyl or alkoxy group with 1 to 4 C atoms. $R^1$ is optionally fluorinated alkyl with 1 to 4, preferably 1 to 3 C atoms. Halogen is preferably F or Cl. More preferably R, in these compounds, is selected from F, Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$, and $OC_2F_5$, in particular from F, Cl, CN, $OCH_3$ and $OCF_3$.

In the compounds of formula I, R may be an achiral or a chiral group. In case of a chiral group it is preferably of formula III:

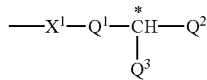

wherein $X^1$ is —O—, —S—, —CO—, —COO—, —OCO—, —OCOO— or a single bond, $Q^1$ is an alkylene or alkylene-oxy group of 1 to 10 C atoms or a single bond, $Q^2$ is an alkyl or alkoxy group of 1 to 10 C atoms which is unsubstituted, mono- or polysubstituted by halogen or CN, wherein optionally and independently, one or more non-adjacent $CH_2$ groups are replaced by —C≡C—, —O—, —S—, —NH—, —N($CH_3$)—, —CO—, —COO—, —OCO—, —OCO—O—, —S—CO— or —CO—S— in a manner that oxygen atoms are not linked directly to one another, $Q^3$ is halogen, a cyano group or an alkyl or alkoxy group with 1 to 4 C atoms which is different from $Q^2$.

In case $Q^1$ in formula III is an alkylene-oxy group, the O atom is preferably adjacent to the chiral C atom.

Preferred chiral R groups are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvalerylloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, and 2-fluorodecyloxy.

In addition, compounds of formula I containing an achiral branched R group may be preferred, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

Another preferred embodiment of the present invention relates to compounds of formula I wherein R is denoting P-(Sp-X)$_n$—.

The polymerizable group P in formula I is preferably selected from $CH_2$=C$W^1$—COO—,

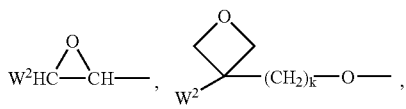

$CH_2$=C$W^2$—O—, $CH_3$—CH=CH—O—, HO—C$W^2W^3$—, HS—C$W^2W^3$—, H$W^2$N—, HO—C$W^2W^3$—NH—, $CH_2$=C$W^1$—CO—NH—, $CH_2$=CH—(COO)$_{k1}$-Phe-(O)$_{k2}$—, Phe-CH=CH—, HOOC—, OCN— and $W^4W^5W^6$Si—, wherein $W^1$ is H, Cl, CN, phenyl or alkyl with 1 to 5 C-atoms, preferably H, Cl or $CH_3$, $W^2$ and $W^3$ are independently of each other H or alkyl with 1 to 5 C-atoms, preferably methyl, ethyl or n-propyl, $W^4$, $W^5$ and $W^6$ are independently of each other Cl, oxaalkyl or oxacarbonylalkyl with 1 to 5 C-atoms, Phe is 1,4-phenylene and $k_1$ and $k_2$ are independently of each other 0 or 1.

More preferably P is an acrylate group, a methacrylate group, a vinyloxy group or an epoxy group, in particular an acrylate or epoxy group.

The spacer group Sp in formula I comprises all groups that are known for this purpose to the skilled in the art. The spacer group Sp is preferably a linear or branched alkylene group having 1 to 20 C atoms, in particular 1 to 12 C atoms, wherein one or more non-adjacent $CH_2$ groups are optionally and independently replaced by —O—, —S—, —NH—, —N($CH_3$)—, —CO—, —O—CO—, —S—CO—, —O—COO—, —CO—S—, —CO—O—, —CH(halogen)-, —CH(CN)—, —CH=CH— or —C≡C—.

Typical spacer groups are, for example, —($CH_2$)$_o$—, —($CH_2CH_2O$)$_p$—$CH_2CH_2$—, —$CH_2CH_2$—S—$CH_2CH_2$— or —$CH_2CH_2$—NH—$CH_2CH_2$—, with o being an integer from 2 to 12 and p being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene.

Preferred are compounds of formula I wherein Sp is an alkyl or alkoxy group having 2 to 8 C atoms. Straight-chain alkyl or alkoxy groups are especially preferred.

In another preferred embodiment of the invention the chiral compounds of formula I comprise at least one spacer group Sp that is a chiral group of the formula IV:

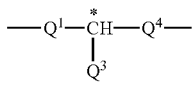

wherein $Q^1$ and $Q^3$ have the meanings given in formula III, and $Q^4$ is an alkylene or alkylene-oxy group of 1 to 10 C atoms or a single bond, which is different from $Q^1$.

Where R is P-Sp-X-, and n is 1, the two spacer groups Sp in the compounds of formula I may be identical or different.

Of the preferred compounds described above, particularly preferred are those wherein n is 1.

Further preferred are compounds comprising both a group P-(Sp-X)$_n$— wherein n is 0 and a group P-(Sp-X)$_n$— wherein n is 1.

The compounds of formula I can be synthesized according to or in analogy to methods which are known per se and which are described in standard works of organic chemistry, for example, Houben-Weyl, Methoden der organischen Chemie, Thieme-Verlag, Stuttgart. Some specific methods of preparation can be taken from the examples.

Examples of suitable polymerizable mesogenic compounds that can be used as components of the polymerizable CLC material, are disclosed for example in WO 93/22397; EP 0,261,712; DE 195,04,224; WO 95/22586 and WO 97/00600. The compounds disclosed in these documents, however, are to be regarded merely as examples that shall not limit the scope of this invention. Preferably the polymerizable CLC mixture comprises at least one polymerizable mesogenic compound having one polymerizable functional group and at least one polymerizable mesogenic compound having two or more polymerizable functional groups.

Examples of especially useful monoreactive chiral and achiral polymerizable mesogenic compounds are shown in the following illustrative, nonlimiting list of compounds:

wherein, P is as defined previously, x is an integer from 1 to 12, A is 1,4-phenylene or 1,4-cyclohexylene, D is 1,4-phenylene or 1,4-cyclohexylene, v is 0 or 1, Y is a polar group as defined above, $R^0$ is an non-polar alkyl or alkoxy group as defined above, Ter is a terpenoid radical, for example, menthyl, Chol is a cholesteryl group, and $L^1$ and

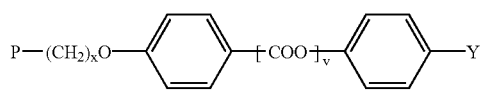 (Va)

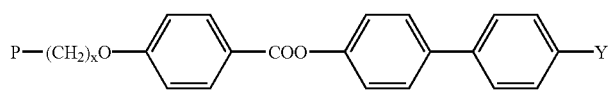 (Vb)

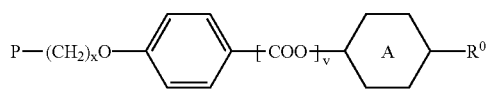 (Vc)

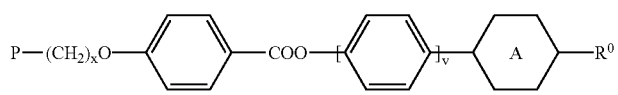 (Vd)

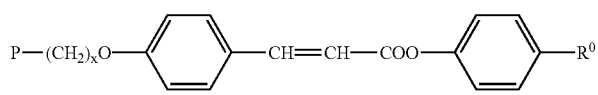 (Ve)

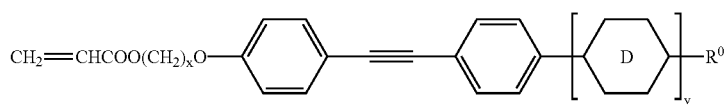 (Vf)

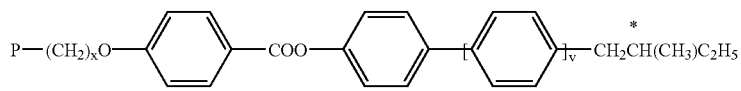 (Vg)

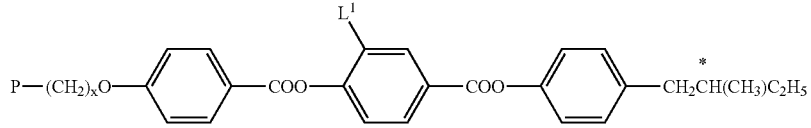 (Vh)

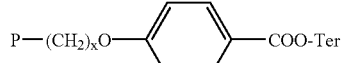 (Vi)

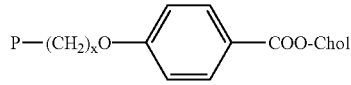 (Vk)

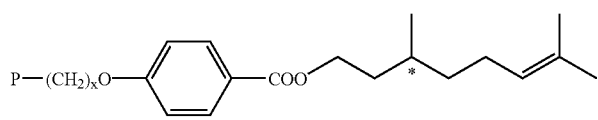 (Vm)

$L^2$ are each independently H, F, Cl, OH, CN, $NO_2$ or an optionally halogenated alkyl, alkoxy or carbonyl group with 1 to 7 C atoms.

Examples of useful di-reactive chiral and achiral polymerizable mesogenic compounds are shown in the following illustrative, nonlimiting list of compounds, ably these compounds are selected of formula I, wherein MG, Sp and/or R comprise a chiral moiety. Particularly preferred are chiral compounds selected of the formula Va to Vm above.

In another preferred embodiment of the present invention the polymerizable liquid crystal material comprises one or more non-polymerizable chiral dopants.

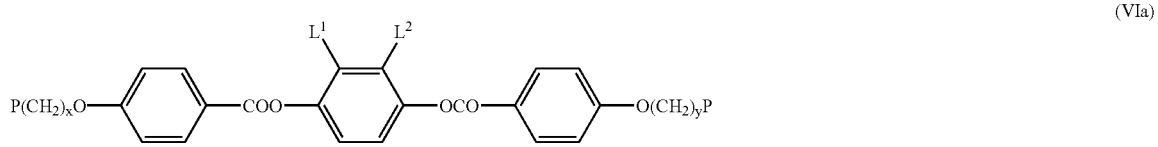

(VIa)

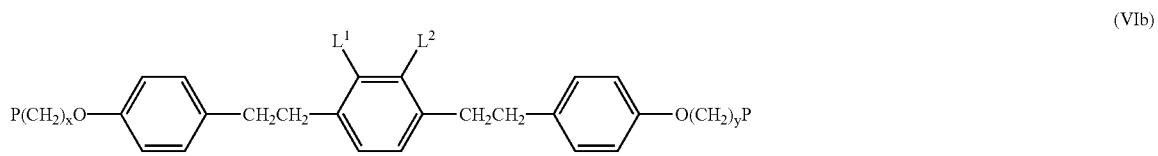

(VIb)

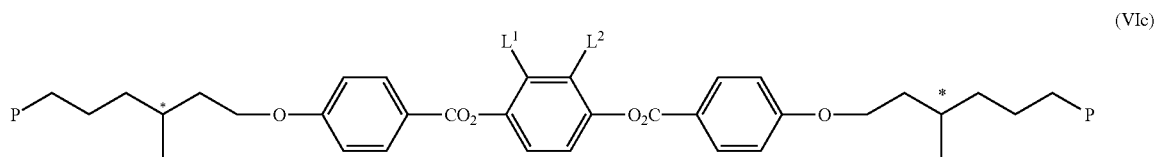

(VIc)

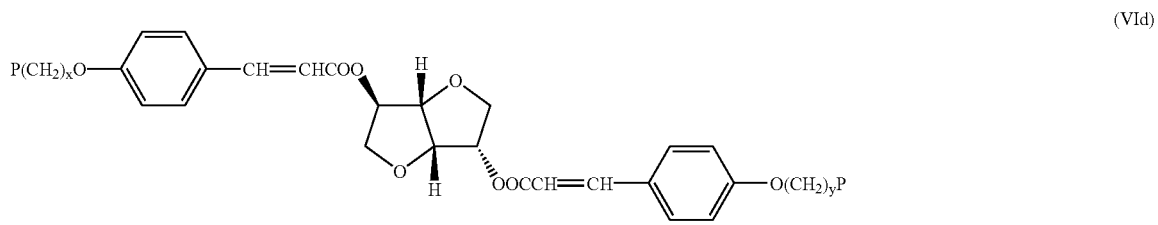

(VId)

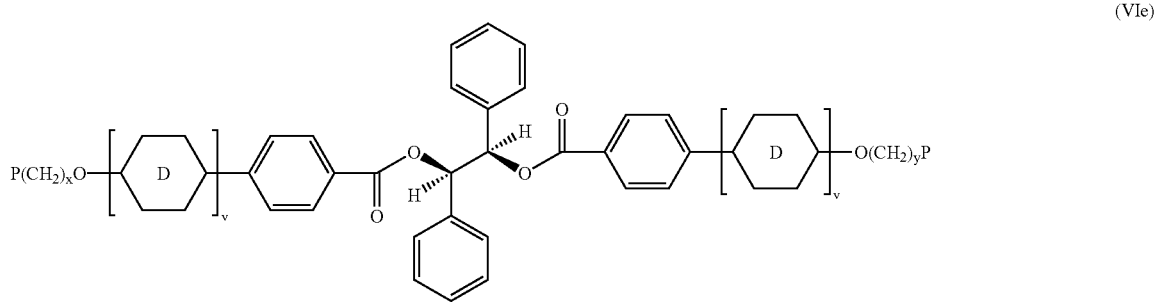

(VIe)

wherein P, x, v, D, $L^1$ and $L^2$ have one of the meanings given above and y is an integer from 1 to 12 the same as or different from x.

A polymerizable liquid crystal material according to a preferred embodiment of the invention comprises one or more chiral polymerizable mesogenic compounds. Prefer- Especially preferred are chiral dopants with a high helical twisting power (HTP), in particular those disclosed in WO 98/00428. Further used chiral dopants are the commercially available S 1011, R 811 or CB 15 (from Merck KGaA, Darmstadt, Germany).

Especially preferred are chiral dopants of formula VII

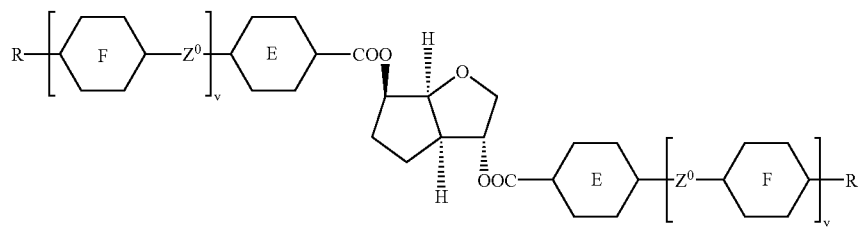

VII and formula VIII

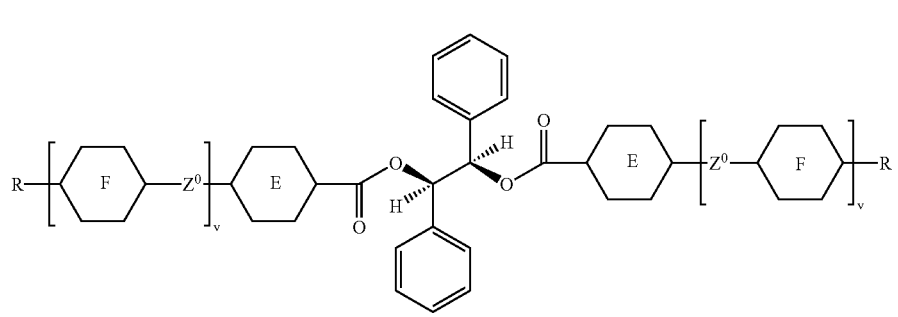

VIII including the respective (R,R), (R,S), (S,R) and (S,S) enantiomers not shown, wherein E and F are each independently 1,4-phenylene or trans-1,4-cyclohexylene which are optionally substituted by L as defined above, v is 0 or 1, $Z^0$ is —COO—, —OCO—, —CH$_2$CH$_2$— or a single bond, and R is alkyl, alkoxy or alkanoyl with 1 to 12 C atoms.

The compounds of formula VII and their synthesis are described in WO 98/00428. The compounds of formula VIII and their synthesis are described in GB 2,328,207.

The above chiral compounds of formula VII and VIII exhibit a very high helical twisting power (HTP), and are therefore particularly useful for the purpose of the present invention.

A first preferred polymerizable liquid crystal material comprises
a) 5 to 80%, more preferably 10 to 65% by weight of preferably up to five, more preferably one, two or three monoreactive mesogenic compounds having a polar terminal group,
b) 10 to 90%, more preferably 25 to 75% by weight of preferably up to four, more preferably one or two, direactive polymerizable mesogenic compounds,
c) 0.1 to 15%, more preferably 0.2 to 9% by weight of preferably up to three, more preferably one or two, non-polymerizable chiral dopants,
d) 0.5 to 10%, more preferably 1 to 7% by weight of a polymerization initiator,
e) 0.01 to 6%, more preferably 0.1 to 3% by weight of one or more polymerizable surface-active compounds.

A second preferred polymerizable liquid crystal material comprises
a) 0 to 30%, more preferably 0 to 5% by weight of preferably up to five, more preferably one, two or three monoreactive mesogenic compounds having a polar terminal group,
b) 90% or more, more preferably 90 to 99.5% by weight of preferably up to four, more preferably one or two, direactive polymerizable mesogenic compounds,
c) 0.1 to 15%, more preferably 0.2 to 9% by weight of preferably up to three, more preferably one or two, non-polymerizable chiral dopants,
d) 0.5 to 10%, more preferably 1 to 7% by weight of a polymerization initiator,
e) 0.01 to 6%, more preferably 0.1 to 3% by weight of one or more polymerizable surface-active compounds.

Especially preferred mixtures of the second embodiment are those containing no monoreactive polymerizable compounds of component a).

A third preferred polymerizable liquid crystal material comprises
a) 80% or more, more preferably 90 to 99.5% by weight of preferably up to five, more preferably one, two or three monoreactive mesogenic compounds having a polar terminal group,
b) 0 to 20%, more preferably 0 to 5% by weight of preferably up to four, more preferably one or two, direactive polymerizable mesogenic compounds,
c) 0.1 to 15%, more preferably 0.2 to 9% by weight of preferably up to three, more preferably one or two, non-polymerizable chiral dopants,
d) 0.5 to 10%, more preferably 1 to 7% by weight of a polymerization initiator,
e) 0.01 to 6%, more preferably 0.1 to 3% by weight of one or more polymerizable surface-active compounds.

Especially preferred mixtures of the third embodiment are those containing no direactive polymerizable compounds of component b).

The compounds of component a) are preferably selected from the above formulae Va and Vb.

The compounds of component b) are preferably selected from the above formulae VIa and VIb.

The compounds of component c) are preferably selected from the above formulae VII and VIII.

The compounds of component e) are preferably selected from the above formulae IX and X.

In each three of the preferred polymerizable liquid crystal materials, preference is given to compounds of component a) monoreactive mesogenic compounds which are according to formula I, wherein said components have a polar terminal group which can be the same or different. Further preference is given to compounds of component b) di-reactive polymerizable mesogenic compounds which are according to formula I. One of the differences between compounds of component a) and b) when they are each according to formula I, is the choice for group R, i.e., whether it is polymerizable or not.

According to the inventive method, the polymerizable liquid crystal material is coated onto a substrate and aligned into a uniform orientation. It can then be subsequently polymerized to permanently fix the orientation of the cholesteric material.

The substrate, for example, can be a glass or quartz sheet or a plastic film or sheet. In case of a polymerizable material, the substrate may or may not be removed after polymerization. In case the substrate is not removed from the polymerized film after polymerization, preferably an isotropic substrate is used.

The substrate may also be a plastic substrate, for example, a film of polyester, such as polyethyleneterephthalate (PET), or of polyvinylalcohol (PVA), polycarbonate (PC) or triacetylcellulose (TAC), especially preferably a PET film or a TAC film. A birefringent substrate, for example, an uniaxially stretched plastic film can also be used. PET films are commercially available from ICI Corp. under the trade name Melinex.

Preferred are glass substrates, in particular when covered with rubbed polyimide.

The polymerizable liquid crystal material can also be dissolved in a solvent, preferably in an organic solvent. The solution is then coated onto the substrate, for example, by spin-coating or other known techniques, and the solvent is evaporated off. In most cases it is suitable to heat the mixture in order to facilitate the evaporation of the solvent.

In addition to the methods described above, planar alignment in the coated layer of the polymerizable liquid crystal material can further be enhanced by shearing the material, e.g. by means of a doctor blade. It is also possible to apply an alignment layer, for example a layer of rubbed polyimide or sputtered $SiO_x$, wherein x is 1 to 2, on top of the substrate, or alternatively to directly rub the substrate, without applying an additional alignment layer.

Rubbing, for example, can be achieved by means of a rubbing cloth, such as a velvet cloth, or with a flat bar coated with a rubbing cloth. In a preferred embodiment of the present invention rubbing is achieved by means of at least one rubbing roller, e.g., a fast spinning roller that brushes across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

Polymerization of the polymerizable liquid crystal material is achieved, for example, by exposure to heat or actinic radiation. Actinic radiation means irradiation with light, for example, UV light, IR light or visible light, irradiation with X-rays or gamma rays or irradiation with high energy particles, for example, ions or electrons. Preferably polymerization is carried out by UV irradiation.

As a source for actinic radiation, for example, a single UV lamp or a set of UV lamps can be used. When using a high lamp power the curing time can be reduced. Another possible source for actinic radiation is a laser, for example, a UV laser, an IR laser or a visible laser.

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used, when curing polymerizable mesogens vinyl and epoxide groups, preferably a cationic photoinitiator is used.

It is also possible to use a polymerization initiator that decomposes when heated to produce free radicals or ions that start the polymerization.

As a photoinitiator for radical polymerization, for example, the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable liquid crystal material preferably comprises 0.01 to 10%, more preferably 0.05 to 5%, in particular 0.1 to 3% of a polymerization initiator. UV photoinitiators are preferred, in particular radicalic UV photoinitiators.

The curing time depends, inter alia, on the reactivity of the polymerizable mesogenic material, the thickness of the coated layer, the type of polymerization initiator and the power of the UV lamp. The curing time according to the invention is preferably not longer than 10 minutes, more preferably not longer than 5 minutes and particularly preferably shorter than 2 minutes. For mass production short curing times of 3 minutes or less, more preferably of 1 minute or less, in particular of 30 seconds or less, are preferred.

In addition to polymerization initiators the polymerizable material may also comprise one or more other suitable components, for example, catalysts, stabilizers, chain-transfer agents or co-reacting monomers. In particular the addition of stabilizers is preferred in order to prevent undesired spontaneous polymerization of the polymerizable material, for example, during storage.

As stabilizers all compounds can be used that are known to the skilled in the art for this purpose. These compounds are commercially available in a broad variety. Typical examples for stabilizers are 4-ethoxyphenol or butylated hydroxytoluene (BHT).

Other additives, for example, chain transfer agents, can also be added to the polymerizable material in order to modify the physical properties of the inventive polymer film. When adding a chain transfer agent, such as a monofunctional thiol compound like dodecane thiol, or a multifunctional thiol compound like trimethylpropane tri(3-mercaptopropionate), to the polymerizable material, the length of the free polymer chains and/or the length of the polymer chains between two crosslinks in the inventive polymer film can be controlled. When the amount of the chain transfer agent is increased, the polymer chain length in the obtained polymer film decreases.

In order to increase crosslinking of the polymers, one can add up to 20% of a non mesogenic compound with two or more polymerizable functional groups to the polymerizable material alternatively or in addition to the di- or multifunctional polymerizable mesogenic compounds to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the polymerizable CLC mixture comprises up to 70%, preferably 3 to 50% of a non mesogenic compound with one polymerizable functional group. Typical examples for monofunctional non mesogenic monomers are alkylacrylates or alkylmethacrylates.

It is also possible to add, for example, up to 20% by weight of a non polymerizable liquid-crystalline compound to influence the optical properties of the optical retardation film. In a preferred embodiment of the invention the polymerization of the polymerizable CLC mixture is carried out under inert gas atmosphere, preferably under a nitrogen atmosphere.

The selection of suitable polymerization temperatures depends mainly on the clearing point of the polymerizable material and inter alia on the softening point of the substrate. Preferably the polymerization temperature is at least 30 degrees below the clearing temperature of the polymerizable mesogenic mixture.

The inventive mixtures and films can be used, for example, in optical and electrooptical devices like liquid crystal displays or projection systems, or for decorative or security applications. The polymer films with planar alignment obtained from the inventive mixtures are particularly suitable as optical films for optical devices, for example, polarizers, compensators, beam splitters, reflective films, color filters, decorative or security markings, colored images, holographic elements, hot stamping foils, and for the preparation of liquid crystal pigments for decorative or security applications, like false-proof markings or security threads on banknotes or on other documents of value.

Polymerizable cholesteric liquid crystal mixtures and polymer films obtained thereof are particularly suitable for applications where the film is part of a composite liquid crystal cell, for example, an alignment layer or a color filter. Nematic mixtures are especially suitable as alignment layers. Cholesteric mixtures are especially suitable as color filters.

Without further elaboration, it is believed that one skilled in the art can, using the preceding description, utilize the present invention to ist fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

The entire disclosure[s] of all applications, patents and publications, cited above or below, and of corresponding European application No. 01110189.6, filed May 8, 2001, and European application No. 01116737.6, filed Jul. 19, 2001, are hereby incorporated by reference.

The following abbreviations are used to illustrate the liquid crystalline phase behavior of the compounds: K=crystalline; N=nematic; S=smectic; Ch=cholesteric; I=isotropic. The numbers between the symbols indicate the phase transition temperatures in ° C.

EXAMPLE 1

Three polymerizable cholesteric liquid crystal mixtures A, B and C were formulated as shown in table 1. Mixture A contains a polymerizable surfactant, mixture B a non-polymerizable surfactant and mixture C does not contain a surfactant.

TABLE 1

Composition of polymerizable cholesteric mixtures

|  | A | B | C |
| --- | --- | --- | --- |
| Compound (1) | 50.00% | 50.00% | 50.00% |
| compound (2) | 12.50% | 12.50% | 12.50% |
| compound (3) | 9.02% | 9.02% | 9.02% |
| compound (4) | 21.95% | 21.95% | 21.95% |
| compound (5) | 4.50% | 4.50% | 4.50% |
| 4-Methoxyphenol | 0.03% | 0.03% | 0.03% |
| TPO | 1.00% | 1.00% | 1.00% |
| Fluorad FX-13 ® | 1.00% | 0.00% | 0.00% |
| FC171 ® | 0.00% | 1.00% | 0.00% |

(1)

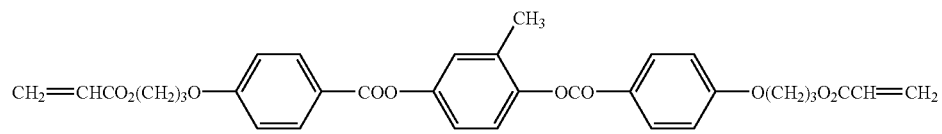

(2)

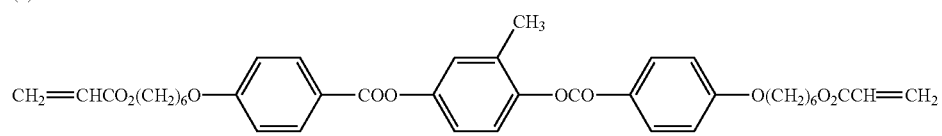

TABLE 1-continued

Composition of polymerizable cholesteric mixtures

| | A | B | C |
|---|---|---|---|

(3) $CH_2$=CHCOO$(CH_2)_6$O—⟨benzene⟩—COO—⟨benzene⟩—CN (4) $CH_2$=CHCOO$(CH_2)_6$O—⟨benzene⟩—COO—⟨benzene⟩—$OCH_3$ (5) $H_{13}C_6$O—⟨benzene⟩—COO—⟨bicyclic dianhydrohexitol with H stereochemistry⟩—OCO—⟨benzene⟩—$OC_6H_{13}$ Compounds (1) and (2) can be prepared in analogy to the methods described in WO 93/22397. Compounds (3) and (4) can be prepared in analogy to the methods described in D. J. Broer et al., Makromol.Chem. 190, 3201–3215 (1989). The preparation of the chiral dopant (5) is described in WO 98/00428. FX-13® is a polymerizable surfactant of formula IX above, which is commercially available from 3M (St. Paul, Minn., USA). TPO (2,4,6-trimethylbenzoyl-diphenylphosphine oxide), Trademark Lucirin® TPO, is a commercially available photoinitiator from BASF (Ludwigshafen, Germany). 4-Methoxyphenol is a commercially available stabilizer. FC171 is a non-polymerizable fluorocarbon surfactant of the formula $C_nF_{2n+1}SO_2N(C_2H_5)(CH_2CH_2O)_xCH_3$, wherein n is an integer from 4 to 12 and x is an integer from 5 to 15, which is commercially available from 3M (St. Paul, Minn., USA).

Preparation of Films

A 50 wt. % solution of each of the mixtures A, B and C was prepared in xylene. The solution was filtered through a 0.2 μm PTFE membrane filter prior to use. A first layer of mixture A and B respectively was spin coated onto a rubbed polyimide/glass substrate at 3,000 RPM for 30 s. The film was annealed at 70° C. for 30 s and photo-polymerized at 70° C. using 19.5 mWcm$^{-2}$ UV-A radiation for 60 s in a nitrogen atmosphere. Stacked films were then prepared by spin coating a second layer of mixture C directly onto the first layers of mixture A and B, respectively. The second layer was annealed at 70° C. for 30 s and photo-polymerized at ambient temperature using 19.5 mWcm$^{-2}$ UV-A radiation for 60 s in a nitrogen atmosphere.

Surface Energy Measurements

The surface energy of the mono- and bilayer films produced was determined from contact angle measurements taken using a Kruss DSA10 instrument linked to a PC. The analysis was performed using the specialist software supplied with the instrument. Contact angles of water (BDH, HPLC grade), ethylene glycol (Aldrich 99+% Spectrophotometric grade) and diiodomethane (Aldrich 99%) were measured to determine the surface energy of the films. The solvents were used as supplied. All measurements were taken at 22° C. The contact angles used are an average of at least 4 measurements fitted according to Young-LaPlace. The Surface energies were obtained using Owen-Wendt-Rabel-Kaelbe (OWRK) theory. The data is collected in Table 2.

TABLE 2

Contact angle measurements and surface energy γ for mono- and bilayer polymer films of mixtures A, B and C

| Stack | Water/° | Ethylene glycol/° | Diiodo-methane/° | γ/ mNm$^{-1}$ | γ$^d$/ mNm$^{-1}$ | γ$^p$/ mNm$^{-1}$ |
|---|---|---|---|---|---|---|
| A | 101.78 ± 1.82 | 77.97 ± 1.04 | 64.04 ± 1.32 | 25.16 | 24.65 | 0.51 |
| B | 78.67 ± 0.90 | 57.23 ± 1.09 | 37.72 ± 1.89 | 39.45 | 35.67 | 3.78 |
| C | 71.60 ± 1.33 | 54.51 ± 0.56 | 41.11 ± 1.55 | 40.23 | 33.24 | 6.98 |
| A + C | 70.79 ± 1.06 | 54.07 ± 1.59 | 33.49 ± 1.48 | 42.30 | 35.92 | 6.38 |
| B + C | 80.84 ± 1.39 | 59.96 ± 1.95 | 44.48 ± 1.41 | 36.61 | 32.87 | 3.74 |

The superscript d and p refers to dispersive and polar components of the surface energy.

The superscript d and p refers to dispersive and polar components of the surface energy.

Analysis of the surface energy data for the films of mixtures A, B and C reveals that the addition of a surfactant to the liquid crystal mixture reduces the surface energy of the film. The addition of the polymerizable surfactant FX13 is more effective than the non-polymerizable surfactant FC171 at reducing the overall surface energy of the polymerized film. Analysis of the contact angle measurements by OWRK theory allows the dispersive and polar components of the surface energy to be determined (Table 2). These results show that the surface energy of the film containing the polymerizable surfactant FX13 (A) is predominately dispersive in nature with only a small polar contribution. The surface energy of the film containing no surfactant (C) exhibits the greatest surface energy with an increase in magnitude of both the polar and dispersive components. The dispersive component of the surface energy of the film containing the non-polymerizable surfactant FC171 (B) is similar to that of the neat liquid crystal film (C) whereas the magnitude of its polar component is significantly reduced compared to (C). Therefore, examination of both the dispersive and polar contributions of the surface energies of the films allows the migration of surfactant through the stacked layers to be detected. Stacked films have been produced by the addition of a second layer of the liquid crystal mixture without surfactant (C) to a film of both (A) and (B). The dispersive and polar contributions to the surface energy for the stacked film of (A)+(C) are very similar to those of just the film of the liquid crystal mixture without surfactant (C), suggesting that the polymerizable surfactant does not migrate from the lower to the upper layer or that its migration has been significantly reduced. The dispersive contribution for the films (B) and (C) are similar in magnitude. Hence, for this example, the magnitude of the dispersive contribution to the surface energy for the stack of (B)+(C) is not suitable to use as an indication of surfactant migration. However, the polar contributions in these films are sufficiently different. The polar contribution to the surface energy for the stacked film of (B)+(C) is similar to the film containing the non-polymerizable surfactant FC171 (B), suggesting that FC171 has migrated from the first layer into the second layer. Hence the use of a polymerizable surfactant has been demonstrated to significantly reduce surfactant migration in a stack of films.

EXAMPLE 2

The following polymerizable nematic mixture was formulated

| Compound (1) | 99.0% |
| Fluorad FX-13 ® | 0.5% |
| Irgacure 651 ® | 0.5% |

Irgacure 651® is a commercially available photoinitiator from Ciba AG (Basel, Switzerland).

EXAMPLE 3

The following polymerizable cholesteric mixture was formulated

| Compound (1) | 92.0% |
| Paliocolor LC756 ® | 7.0% |
| Fluorad FX-13 ® | 0.5% |
| Irgacure 651 ® | 0.5% |

Paliocolor 756® is a di-reactive polymerizable chiral compound commercially available from BASF AG (Ludwigshafen, Germany).

EXAMPLE 4

The following polymerizable nematic mixture was formulated

| Compound (3) | 25.0% |
| compound (4) | 25.0% |
| compound (6) | 49.0% |
| Fluorad FX-13 ® | 0.5% |
| Irgacure 651 ® | 0.5% |

(6)

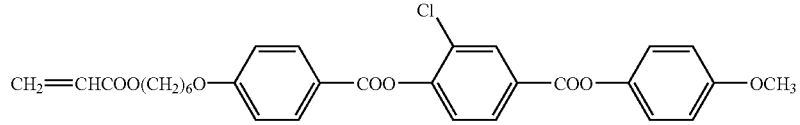

compound (6) can be prepared in analogy to the methods described in WO 93/22397.

EXAMPLE 5

The following polymerizable cholesteric mixture was formulated

| Compound (3) | 25.0% |
| compound (4) | 25.0% |
| compound (5) | 5.0% |
| compound (6) | 44.0% |
| Fluorad FX-13 ® | 0.5% |
| Irgacure 651 ® | 0.5% |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The invention claimed is:

1. A polymerizable liquid crystal material comprising a composition comprising at least one polymerizable mesogenic compound and at least one polymerizable surface-active compound, wherein the polymerizable surface-active compound is a polymerizable fluorocarbon surfactant that comprises one of more polymerizable groups different than an OH group.

2. A polymerizable liquid crystal material comprising at least one polymerizable surface active compound which is a polymerizable fluorocarbon surfactant that comprises one of more polymerizable groups different than an OH group and at least 20% by weight of one or more polymerizable monoreactive mesogenic compounds having one polymerizable group and one polar terminal group.

3. A polymerizable liquid crystal material according to claim 1, comprising 0.01 to 15% by weight of a polymerizable surface-active compound.

4. A polymerizable liquid crystal material comprising at least one polymerizable surface-active compound, at least one polymerizable mesogenic compound, at least 20% by weight of one or more polymerizable monoreactive mesogenic compounds having one polymerizable group and one polar terminal group and one or more chiral compounds.

5. A polymerizable liquid crystal material according to claim 1, further comprising one or more polymerizable mesogenic compounds of formula I P-(Sp-X)$_n$-MG-R      I wherein
P is a polymerizable group,
Sp is a spacer group having 1 to 25 C atoms,
X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH═CH—, —CH═CH—COO—, —OCO—CH═CH—, —C≡C—, or a single bond,
n is 0 or 1,
MG is a mesogenic group, and
R is H, CN, NO$_2$, P-(Sp-X)$_n$—, halogen or a straight-chain or branched alkyl radical of up to 25 C atoms which is unsubstituted, mono- or polysubstituted by halogen or CN, wherein one or more non-adjacent CH$_2$ groups are optionally and independently replaced by —O—, —S—, —NH—, —N(CH$_3$)—, —CO—, —COO—, —OCO—, —OCO—O—, —S—CO—, —CO—S— or —C≡C— in a manner that oxygen atoms are not linked directly to one another.

6. A polymerizable liquid crystal material according to claim 1, wherein the polymerizable surface-active compound comprises one or two polymerizable groups selected from the groups consisting of acryl, methacryl, epoxy, vinyl, vinyloxy, styrene and propenyl ether groups.

7. A polymerizable liquid crystal material according to claim 1, wherein the polymerizable surface-active compound is of formula IX (FX-13) or X (FX-14)

C$_n$F$_{2n+1}$SO$_2$N(C$_2$H$_5$)CH$_2$CH$_2$OCOCH═CH$_2$      IX (FX-13)

C$_n$F$_{2n+1}$SO$_2$N(C$_2$H$_5$)CH$_2$CH$_2$OCOC(CH$_3$)═CH$_2$      X (FX-14)

wherein n is an integer of 4 to 8, and the perfluoroalkyl group may be linear or branched.

8. A polymerizable liquid crystal material comprising
a) 5 to 80% by weight of one to five monoreactive mesogenic compounds of formula I, each independently having a polar terminal group, P-(Sp-X)$_n$-MG-R      I wherein
P is a polymerizable group,
Sp is a spacer group having 1 to 25 C atoms,
X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH═CH—, —CH═CH—COO—, —OCO—CH═CH—, —C≡C—, or a single bond,
n is 0 or 1,
MG is a mesogenic group, and
R is H, CN, NO$_2$, P-(Sp-X)$_n$—, halogen or a straight-chain or branched alkyl radical of up to 25 C atoms which is unsubstituted, mono- or polysubstituted by halogen or CN, wherein one or more non-adjacent CH$_2$ groups are optionally and independently replaced by —O—, —S—, —NH—, —N(CH$_3$)—, —CO—, —COO—, —OCO—, —OCO—O—, —S—CO—, —CO—S— or —C≡C— in a manner that oxygen atoms are not linked directly to one another,
b) 10 to 90% by weight of one to four di-reactive polymerizable mesogenic compounds of formula I,
c) 0.1 to 15% by weight of one to three non-polymerizable chiral dopants,
d) 0.5 to 10% by weight of a polymerization initiator, and
e) 0.01 to 6% by weight of one or more polymerizable surface-active compounds.

9. A polymerizable liquid crystal material comprising
a) 0 to 30% by weight of one to five monoreactive mesogenic compounds of formula I, each independently having a polar terminal group, P-(Sp-X)$_n$-MG-R      I wherein
P is a polymerizable group,
Sp is a spacer group having 1 to 25 C atoms,
X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH═CH—, —CH═CH—COO—, —OCO—CH═CH—, —C≡C—, or a single bond,
n is 0 or 1,
MG is a mesogenic group, and
R is H, CN, NO$_2$, P-(Sp-X)$_n$—, halogen or a straight-chain or branched alkyl radical of up to 25 C atoms which is unsubstituted, mono- or polysubstituted by halogen or CN, wherein one or more non-adjacent CH$_2$ groups are optionally and independently replaced by —O—, —S—, —NH—, —N(CH$_3$)—, —CO—, —COO—, —OCO—, —OCO—O—, —S—CO—, —CO—S— or —C≡C— in a manner that oxygen atoms are not linked directly to one another,
b) 90% or more by weight of one to four di-reactive polymerizable mesogenic compounds of formula I,
c) 0.1 to 15% by weight of one to three non-polymerizable chiral dopants,
d) 0.5 to 10% by weight of a polymerization initiator, and
e) 0.01 to 6% by weight of one or more polymerizable surface-active compounds.

10. A polymerizable liquid crystal material comprising
a) 80% or more by weight of one to five monoreactive mesogenic compounds of formula I, each independently having a polar terminal group, P-(Sp-X)$_n$-MG-R      I wherein
P is a polymerizable group,
Sp is a spacer group having 1 to 25 C atoms,
X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH=CH—, —CH=CH—COO—, —OCO—CH=CH—, —C≡C—, or a single bond, n is 0 or 1, MG is a mesogenic group, and R is H, CN, NO$_2$, P-(Sp-X)$_n$—, halogen or a straight-chain or branched alkyl radical of up to 25 C atoms which is unsubstituted, mono- or polysubstituted by halogen or CN, wherein one or more non-adjacent CH$_2$ groups are optionally and independently replaced by —O—, —S—, —NH—, —N(CH$_3$)—, —CO—, —COO—, —OCO—, —OCO—O—, —S—CO—, —CO—S— or —C≡C— in a manner that oxygen atoms are not linked directly to one another, b) 0 to 20% by weight of one to four di-reactive polymerizable mesogenic compounds of formula I, c) 0.1 to 15% by weight of one to three non-polymerizable chiral dopants, d) 0.5 to 10% by weight of a polymerization initiator, and e) 0.01 to 6% by weight of one or more polymerizable surface-active compounds.

11. A method for preparing an anisotropic polymer film having planar alignment with a low tilt angle, comprising applying onto a substrate a polymerizable liquid crystal material according to claim 1, aligning the material into planar orientation and polymerizing the material.

12. An anisotropic polymer film having planar alignment comprising a polymerizable liquid crystal material according to claim 1.

13. An anisotropic polymer film according to claim 12, wherein the polymerizable liquid crystal material has a tilt angle of less than 3 degrees.

14. An anisotropic polymer film according to claim 12, wherein the polymerizable liquid crystal material exhibits a helically twisted molecular orientation.

15. An optical device, a decorative or security marking, a polarizer, a compensator, a beam splitter, an alignment layer, a reflective film, a color filter, a holographic element, a hot stamping foil, a colored image or a liquid crystal pigment comprising a polymerizable liquid crystal material according to claim 1 or an anisotropic polymer film comprising the polymerizable liquid crystal material according to claim 1.

16. A color filter comprising a polymerizable liquid crystal material according to claim 1 or an anisotropic polymer film comprising the polymerizable liquid crystal material according to claim 1.

17. A polymerizable liquid crystal material according to claim 1, further comprising a polymerizable mesogenic compound having at least one polar terminal group.

18. A polymerizable liquid crystal material according to claim 17, wherein the least one polar terminal group is selected from the group consisting of vinyloxy, acryl, methacryl, epoxy, F, Cl, OH, CN, OCH$_3$, COCH$_3$, COC$_2$H$_5$, COOCH$_3$, COOC$_2$H$_5$, CF$_3$, C$_2$F$_5$, OCF$_3$, OCHF$_2$, and OC$_2$F$_5$.

19. A polymerizable liquid crystal material comprising at least one polymerizable surface-active compound and less than 20% by weight of a polymerizable mesogenic compound which has a non-polar terminal group, wherein the polymerizable surface-active compound is a polymerizable fluorocarbon surfactant that comprises one of more polymerizable groups different than an OH group.

20. A polymerizable liquid crystal material according to claim 1, wherein the polymerizable surface-active compound is a fluorocarbon acrylate or a fluorocarbon methacrylate.

21. A polymerizable liquid crystal material according to claim 5, wherein MG is a group of formula II $$-A^1-Z^1-(A^2-Z^2)_m-A^3- \qquad \text{II}$$

wherein $Z^1$ and $Z^2$ are each independently —COO—, —OCO—, —CH$_2$CH$_2$—, —OCH$_2$—, —CH$_2$O—, —CH=CH—, —OH=OH—COO—, —OCO—CH=CH—, —C≡C—, or a single bond, $A^1$, $A^2$ and $A^3$ are, independently, 1,4-phenylene wherein one or more CH groups are optionally replaced by N, 1,4-cyclohexylene wherein one or two non-adjacent CH$_2$ groups are optionally and independently replaced by O or S, 1,4-cyclohexenylene, 1,4-bicyclo(2,2,2)octylene, piperidine-1,4-diyl, naphthalene-2,6-diyl, decahydronaphthalene-2,6-diyl, or 1,2,3,4-tetrahydronaphthalene-2,6-diyl, which are, each independently, unsubstituted, mono- or polysubstituted with F, Cl, OH, CN, NO$_2$ or an alkyl, alkoxy or alkanoyl group having 1 to 7 C atoms wherein one or more H atoms may be substituted by F or Cl, and m is 0, or 2.

22. A polymerizable liquid crystal material according to claim 4, wherein the chiral compound comprises a mesogenic group having at least one center of chirality of the formulae II*-1 or II*-2

$$-(A^1-Z)_a-G- \qquad \text{II*-1}$$

$$-(A^1-Z)_a-G^2-(Z-A^2)_b- \qquad \text{II-2}$$

wherein

Z is —COO—, —OCO—, —CH$_2$CH$_2$—, —OCH$_2$—, —CH$_2$O—, —CH=CH—, —CH=CH—COO—, —OCO—CH=CH—, —C≡C—, or a single bond, $A^1$, and $A^2$ are, independently, 1,4-phenylene wherein one or more CH groups are optionally replaced by N, 1,4-cyclohexylene wherein one or two non-adjacent CH$_2$ groups are optionally and independently replaced by O or S, 1,4-cyclohexenylene, 1,4-bicyclo(2,2,2)octylene, piperidine-1,4-diyl, naphthalene-2,6-diyl, decahydronaphthalene-2,6-diyl, or 1,2,3,4-tetrahydronaphthalene-2,6-diyl, which are, each independently, unsubstituted, mono- or polysubstituted with F, Cl, OH, CN, NO$_2$ or an alkyl, alkoxy or alkanoyl group having 1 to 7 C atoms wherein one or more H atoms may be substituted by F or Cl, a and b are independently of each other 0, 1 or 2, $G^1$ together with R in formula I forms a terminal chiral group, and $G^2$ is a bivalent chiral group.

23. A polymerizable liquid crystal material according to claim 5, wherein R is of formula III $$-\!\!-X^1\!\!-\!\!Q^1\!\!-\!\!\overset{*}{C}H\!\!-\!\!Q^2 \atop \phantom{-\!\!-X^1\!\!-\!\!Q^1\!\!-\!\!}|\phantom{-\!\!Q^2} \atop \phantom{-\!\!-X^1\!\!-\!\!Q^1\!\!-\!\!}Q^3 \qquad \text{III}$$

wherein

\* denotes a chiral carbon atom, $X^1$ is —O—, —S—, —CO—, —COO—, —OCO—, —OCOO— or a single bond, $Q^1$ is an alkylene or alkylene-oxy group of 1 to 10 C atoms or a single bond, $Q^2$ is an alkyl or alkoxy group of 1 to 10 C atoms which is unsubstituted, mono- or polysubstituted by halogen or CN, wherein optionally and independently one or more non-adjacent $CH_2$ groups are replaced by —C≡C—, —O—, —S—, —NH—, —N($CH_3$)—, —CO—, —COO—, —OCO—, —OCO—O—, —S—CO— or —CO—S—in a manner that oxygen atoms are not linked directly to one another, and
$Q^3$ is halogen, a cyano group or an alkyl or alkoxy group with 1 to 4 C atoms which is different from $Q^2$.

24. A polymerizable liquid crystal material according to claim 5, wherein P is
$CH_2=CW^1$—COO—,

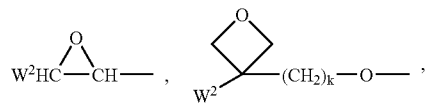

$CH_2=CW^2$—O—, $CH_3$—CH=CH—O—, HS—$CW^2W^3$—, $HW^2N$—, $CH_2=CW^1$—CO—NH—, $CH_2$=CH—$(COO)_{k1}$—Phe—$(O)_{k2}$—, Phe-CH=CH, HOOC—, OCN— and $W^4W^5W^6Si$—,
wherein
$W^1$ is H, Cl, CN, phenyl or alkyl with 1 to 5 C-atoms
$W^2$ and $W^3$ are, independently, H or alkyl with 1 to 5 C-atoms
$W^4$, $W^5$ and $W^6$ are, independently, Cl, oxaalkyl or oxacarbonylalkyl with 1 to 5 C-atoms,
Phe is 1,4-phenylene, and
$k_1$ and $k_2$ are, independently, 0 or 1.

25. A polymerizable liquid crystal material according to claim 5, wherein Sp is a linear or branched alkylene group having 1 to 20 C atoms, wherein one or more non-adjacent $CH_2$ groups are optionally and independently replaced by —O—, —S—, —NH—, —N($CH_3$)—, —CO—, —O—CO—, —S—CO—, —O—COO—, —CO—S—, —CO—O—, —CH(halogen)-, —CH(CN)—, —CH=CH— or —C≡C—.

26. A polymerizable liquid crystal material according to claim 5, wherein Sp is of formula IV

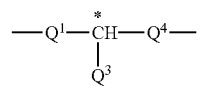   IV wherein
* denotes a chiral carbon atom,
$Q^1$ is an alkylene or alkylene-oxy group of 1 to 10 C atoms or a single bond,
$Q^3$ is halogen, a cyano group or an alkyl or alkoxy group with 1 to 4 C atoms which is different from $Q^2$, and
$Q^4$ is an alkylene or alkylene-oxy group of 1 to 10 C atoms or a single bond, which is different from $Q^1$.

27. A polymerizable liquid crystal material according to claim 8 comprising
a) 10 to 65% by weight of one to five monoreactive mesogenic compounds having a polar terminal group,
b) 25 to 75% by weight of one to four di-reactive polymerizable mesogenic compounds,
c) 0.2 to 9% by weight of one to three non-polymerizable chiral dopants,
d) 1 to 7% by weight of a polymerization initiator, and
e) 0.1 to 3% by weight of one or more polymerizable surface-active compounds.

28. A polymerizable liquid crystal material according to claim 9 comprising
a) 0 to 5% by weight of one to five monoreactive mesogenic compounds having a polar terminal group,
b) 90 to 99.5% by weight of one to four di-reactive polymerizable mesogenic compounds,
c) 0.2 to 9% by weight of one to three non-polymerizable chiral dopants,
d) 1 to 7% by weight of a polymerization initiator, and
e) 0.1 to 3% by weight of one or more polymerizable surface-active compounds.

29. A polymerizable liquid crystal material according to claim 10 comprising
a) 90 to 99.5% by weight of one to five monoreactive mesogenic compounds having a polar terminal group,
b) 0 to 5% by weight of one to four direactive polymerizable mesogenic compounds,
c) 0.2 to 9% by weight of one to three non-polymerizable chiral dopants,
d) 1 to 7% by weight of a polymerization initiator, and
e) 0.1 to 3% by weight of one or more polymerizable surface-active compounds.

30. A polymerizable liquid crystal material comprising at least one polymerizable surface-active compound, at least one polymerizable mesogenic compound and one or more chiral compounds, wherein the polymerizable surface-active compound is a polymerizable fluorocarbon surfactant.

31. A polymerizable liquid crystal material according to claim 8, wherein the polymerizable surface-active compound is a polymerizable fluorocarbon surfactant.

32. A polymerizable liquid crystal material according to claim 9, wherein the polymerizable surface-active compound is a polymerizable fluorocarbon surfactant.

33. A polymerizable liquid crystal material according to claim 10, wherein the polymerizable surface-active compound is a polymerizable fluorocarbon surfactant.

34. A polymer film obtained by a method according to claim 11.

35. A polymerizable liquid crystal material according to claim 21, wherein MG is a group of one of the following formulae

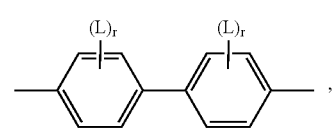   IIa

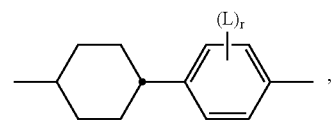   IIb

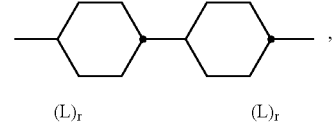   IIc

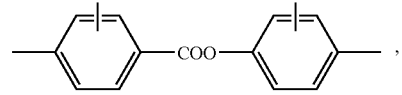   IId

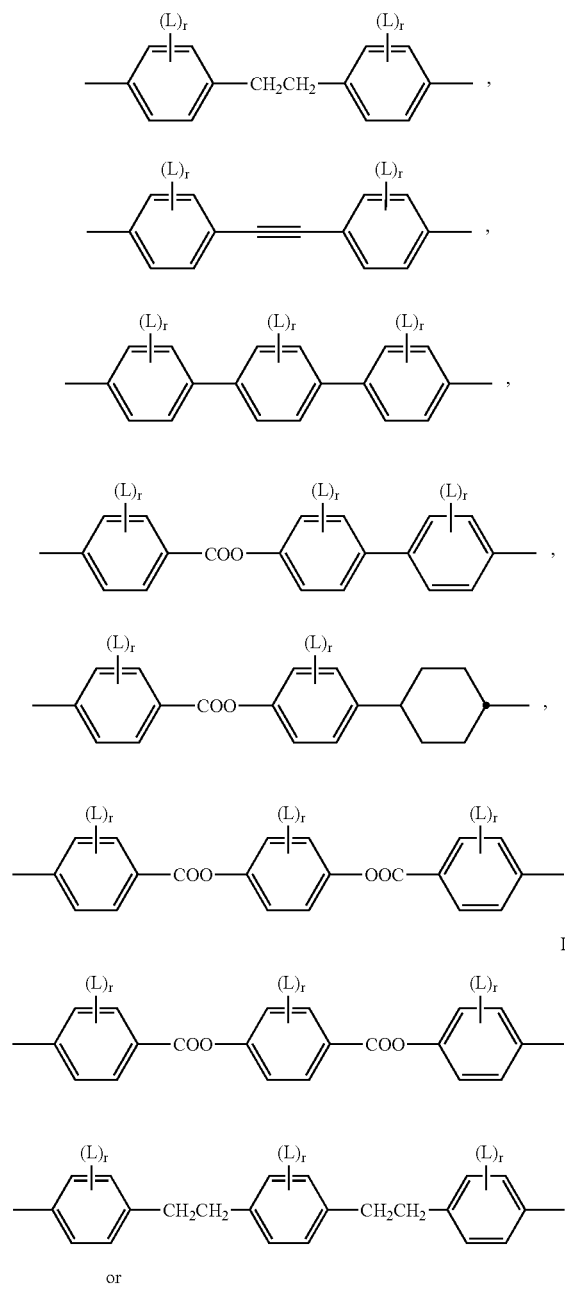

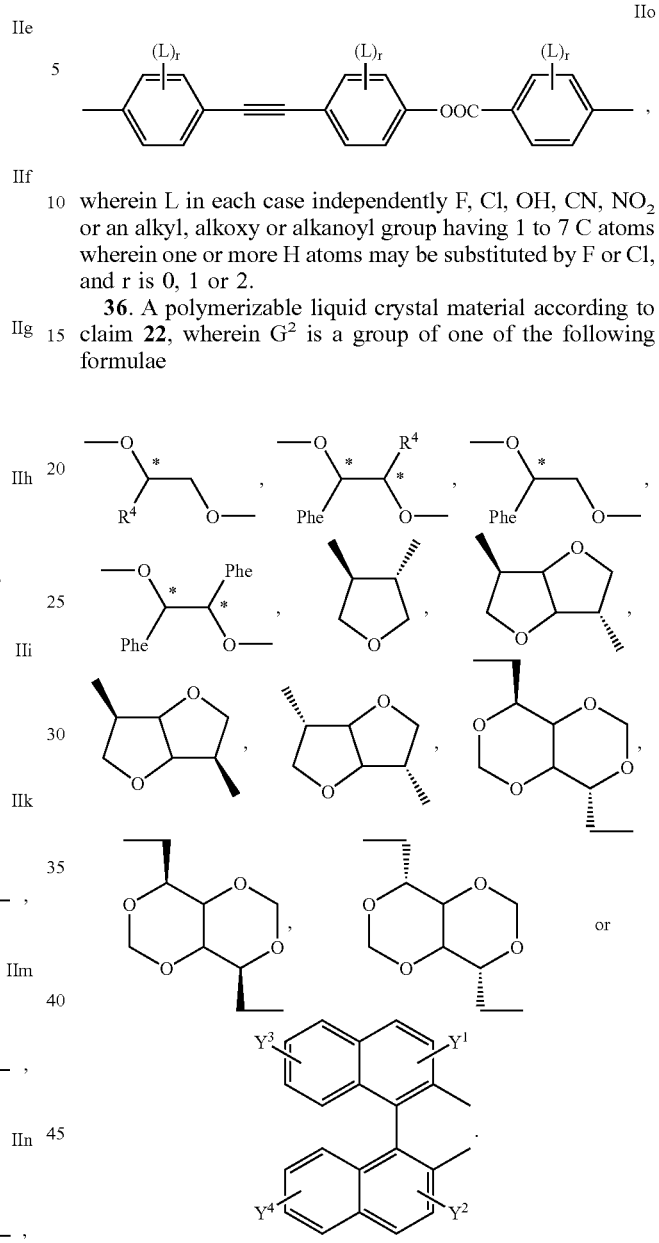

wherein L in each case independently F, Cl, OH, CN, NO$_2$ or an alkyl, alkoxy or alkanoyl group having 1 to 7 C atoms wherein one or more H atoms may be substituted by F or Cl, and r is 0, 1 or 2.

36. A polymerizable liquid crystal material according to claim 22, wherein G$^2$ is a group of one of the following formulae 37. A polymerizable liquid crystal material according to claim 5, wherein the compound of formula I is one of the following formulae

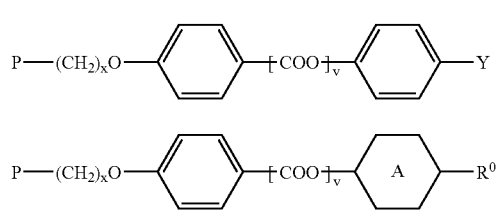

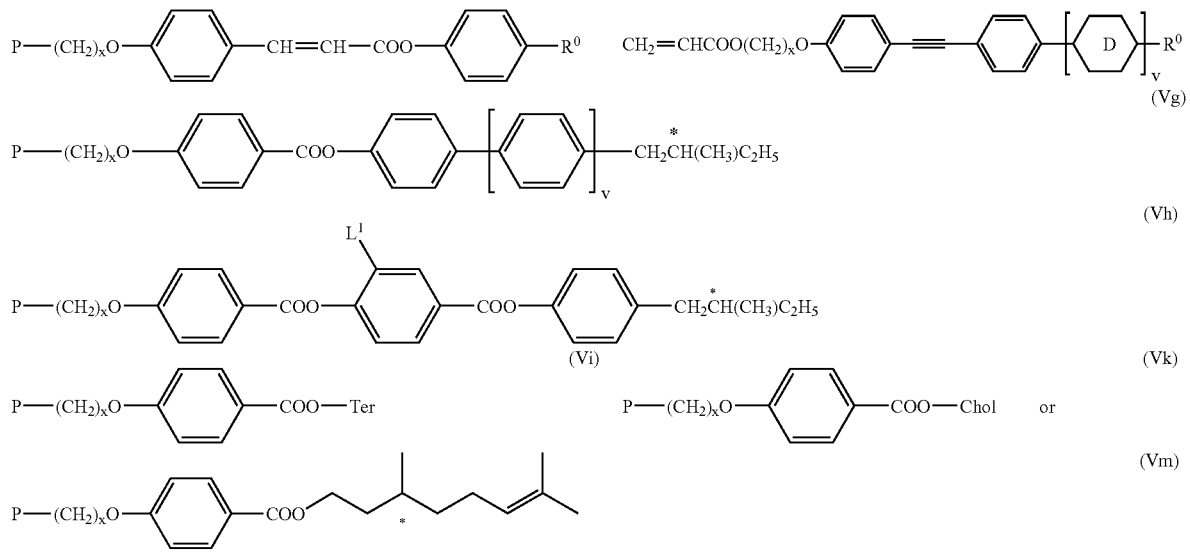

wherein,
P is a polymerizable group,
x is an integer from 1 to 12,
A and D are, each independently of each other, 1,4-phenylene or 1,4-cyclohexylene,
v is 0 or 1,
Y is a polar group, $R^0$ is a non-polar alkyl or alkoxy group,
Ter is a terpenoid radical,
Chol is a cholesteryl group, and
$L^1$ and $L^2$ are each independently H, F, Cl, OH, CN, $NO_2$ or an optionally halogenated alkyl, alkoxy or carbonyl group with 1 to 7 C atoms, or one of the following formulae

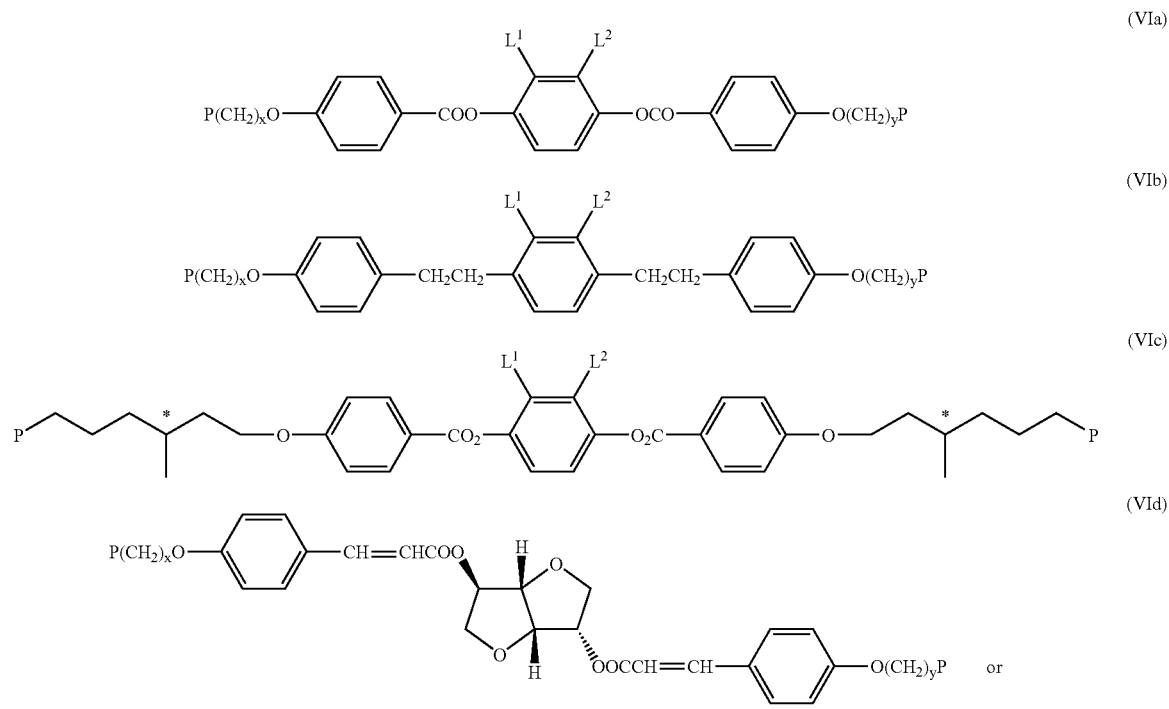

-continued

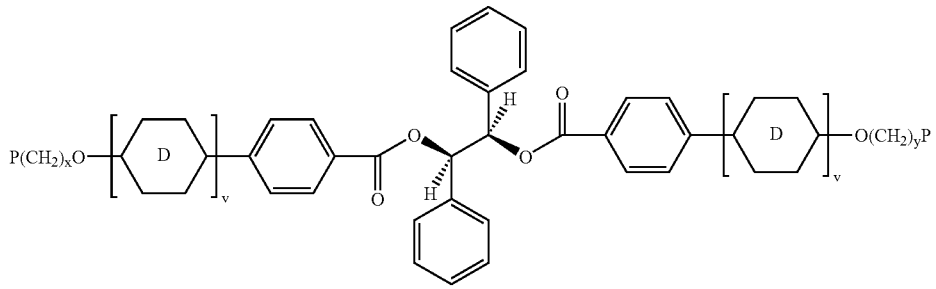
(VIe)

wherein v, P, x, D, $L^1$ and $L^2$ have one of the meanings given above, and y is an integer from 1 to 12.

38. A polymerizable liquid crystal material according to claim 37, wherein Ter is menthyl.

39. A alignment layer comprising a polymerizable liquid crystal material according to claim 1 or an anisotropic polymer film comprising the polymerizable liquid crystal material according to claim 1.

40. A polymerizable liquid crystal material according to claim 5, wherein the compound of formula I is one of the following formulae wherein,
P is a polymerizable group,
x is an integer from 1 to 12,
A is 1,4-phenylene or 1,4-cyclohexylene,
v is 0 or 1,
Y is a polar group,
$R^0$ is a non-polar alkyl or alkoxy group,
Ter is a terpenoid radical,
Chol is a cholesteryl group, and

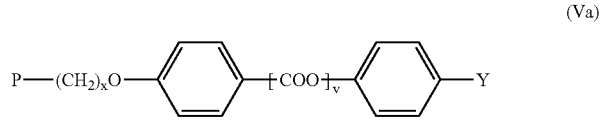
(Va)

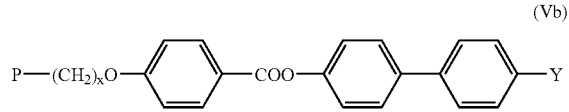
(Vb)

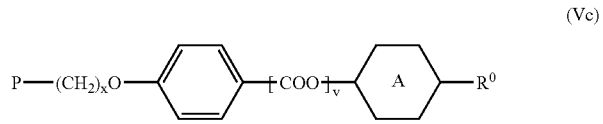
(Vc)

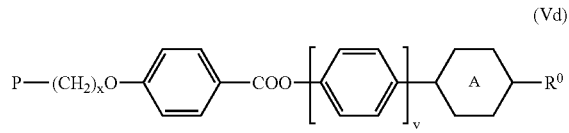
(Vd)

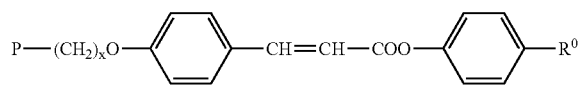
(Ve)

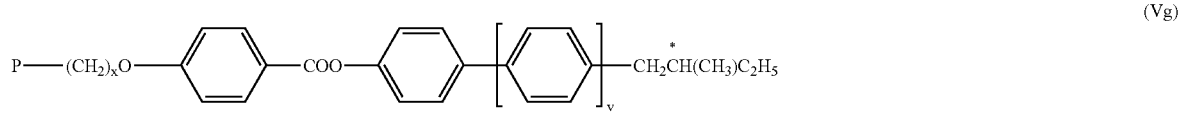
(Vg)

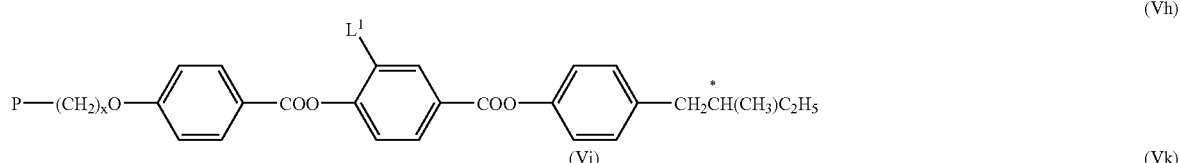
(Vh)

(Vi)

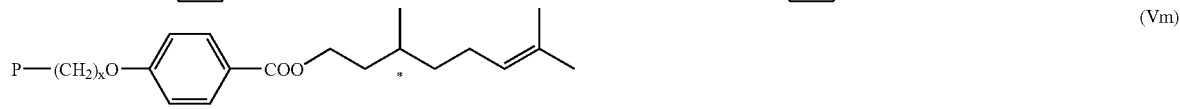
(Vk)

or (Vm)

L¹ and L² are each independently H, F, Cl, OH, CN, NO₂ or an optionally halogenated alkyl, alkoxy or carbonyl group with 1 to 7 C atoms, or one of the following formulae

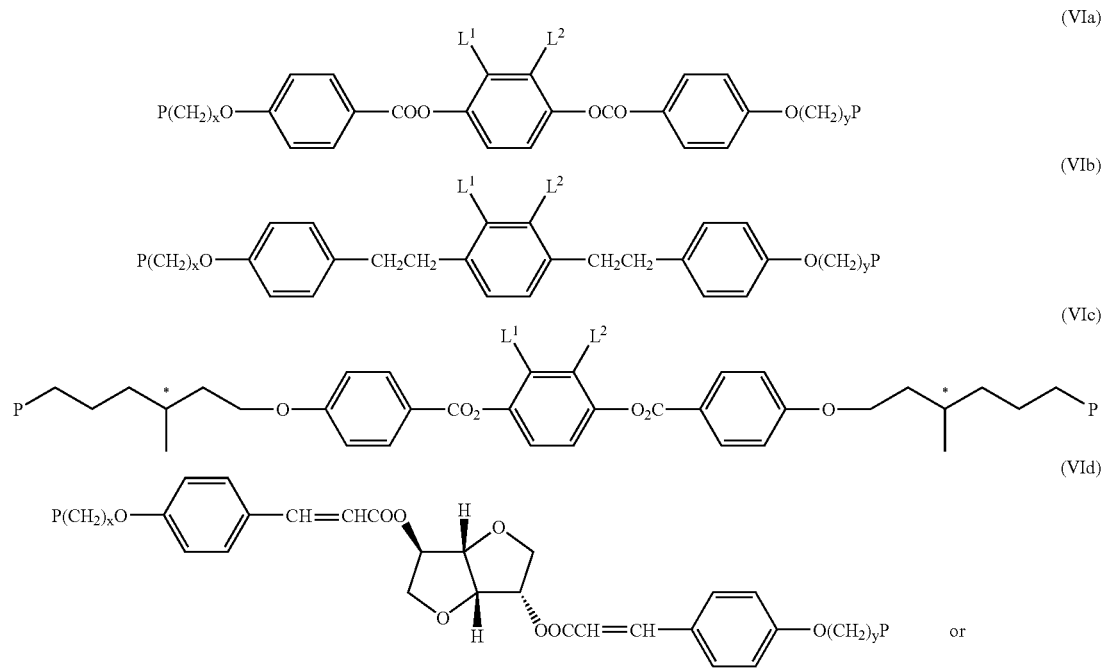

wherein v, P, x, L¹ and L² have one of the meanings given above, and y is an integer from 1 to 12.

41. A polymerizable liquid crystal material according to claim 2, wherein the polymerizable surface-active compound comprises one or two polymerizable groups selected from the groups consisting of acryl, methacryl, epoxy, vinyl, vinyloxy, styrene and propenyl ether groups.

42. A polymerizable liquid crystal material according to claim 2, wherein the polymerizable surface-active compound is of formula IX (FX-13) or X (FX-14)

$$C_nF_{2n+1}SO_2N(C_2H_5)CH_2CH_2OCOCH= CH_2 \qquad \text{IX (FX-13)}$$

$$C_nF_{2n+1}SO_2N(C_2H_5)CH_2CH_2OCOC(CH_3)= CH_2 \qquad \text{X (FX-14)}$$

wherein n is an integer of 4 to 8, and the perfluoroalkyl group may be linear or branched.

43. A polymerizable liquid crystal material according to claim 19, wherein the polymerizable surface-active compound comprises one or two polymerizable groups selected from the groups consisting of acryl, methacryl, epoxy, vinyl, vinyloxy, styrene and propenyl ether groups.

44. A polymerizable liquid crystal material according to claim 19, wherein the polymerizable surface-active compound is of formula IX (FX-13) or X (FX-14)

$$C_nF_{2n+1}SO_2N(C_2H_5)CH_2CH_2OCOCH= CH_2 \qquad \text{IX (FX-13)}$$

$$C_nF_{2n+1}SO_2N(C_2H_5)CH_2CH_2OCOC(CH_3)= CH_2 \qquad \text{X (FX-14)}$$

wherein n is an integer of 4 to 8, and the perfluoroalkyl group may be linear or branched.

* * * * *

UNITED STATES PATENT AND TRADEMARK OFFICE
CERTIFICATE OF CORRECTION

| | | |
|---|---|---|
| PATENT NO. | : 7,029,728 B2 | Page 1 of 1 |
| APPLICATION NO. | : 10/135425 | |
| DATED | : April 18, 2006 | |
| INVENTOR(S) | : Christopher J. Dunn et al. | |

It is certified that error appears in the above-identified patent and that said Letters Patent is hereby corrected as shown below:

Column 28, line 8, reads "R is H, ON," should read -- R is H, CN, --
Column 30, line 8, reads "-OH=OH-COO-," should read -- -CH=CH-COO-, --
Column 30, line 22, reads "m is 0, or2." should read -- m is 0, 1 or 2. --
Column 30, line 27, reads "-($A^1$-Z)$_a$-G-" should read -- -($A^1$-Z)$_a$-$G^1$- --
Column 31, line 22, reads "CH=CH," should read -- CH=CH-, --

Signed and Sealed this

Thirty-first Day of July, 2007

JON W. DUDAS
*Director of the United States Patent and Trademark Office*